Aug. 19, 1952     O. W. SHELOR     2,607,277
GARDEN TRACTOR

Filed May 24, 1948     3 Sheets-Sheet 1

Inventor
O. W. SHELOR
By Mason, Fenwick & Lawrence
Attorneys

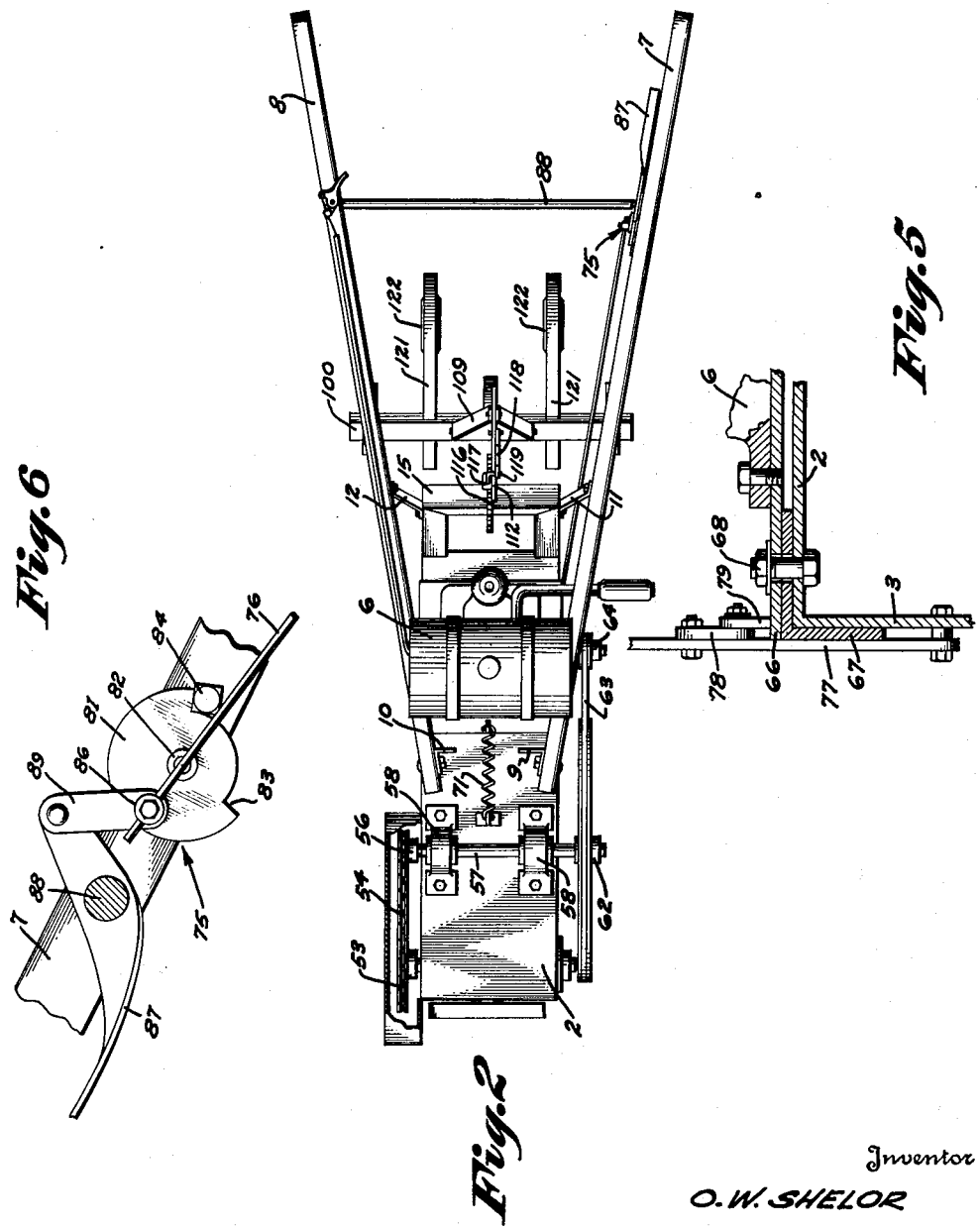

Aug. 19, 1952     O. W. SHELOR     2,607,277
GARDEN TRACTOR
Filed May 24, 1948     3 Sheets-Sheet 3
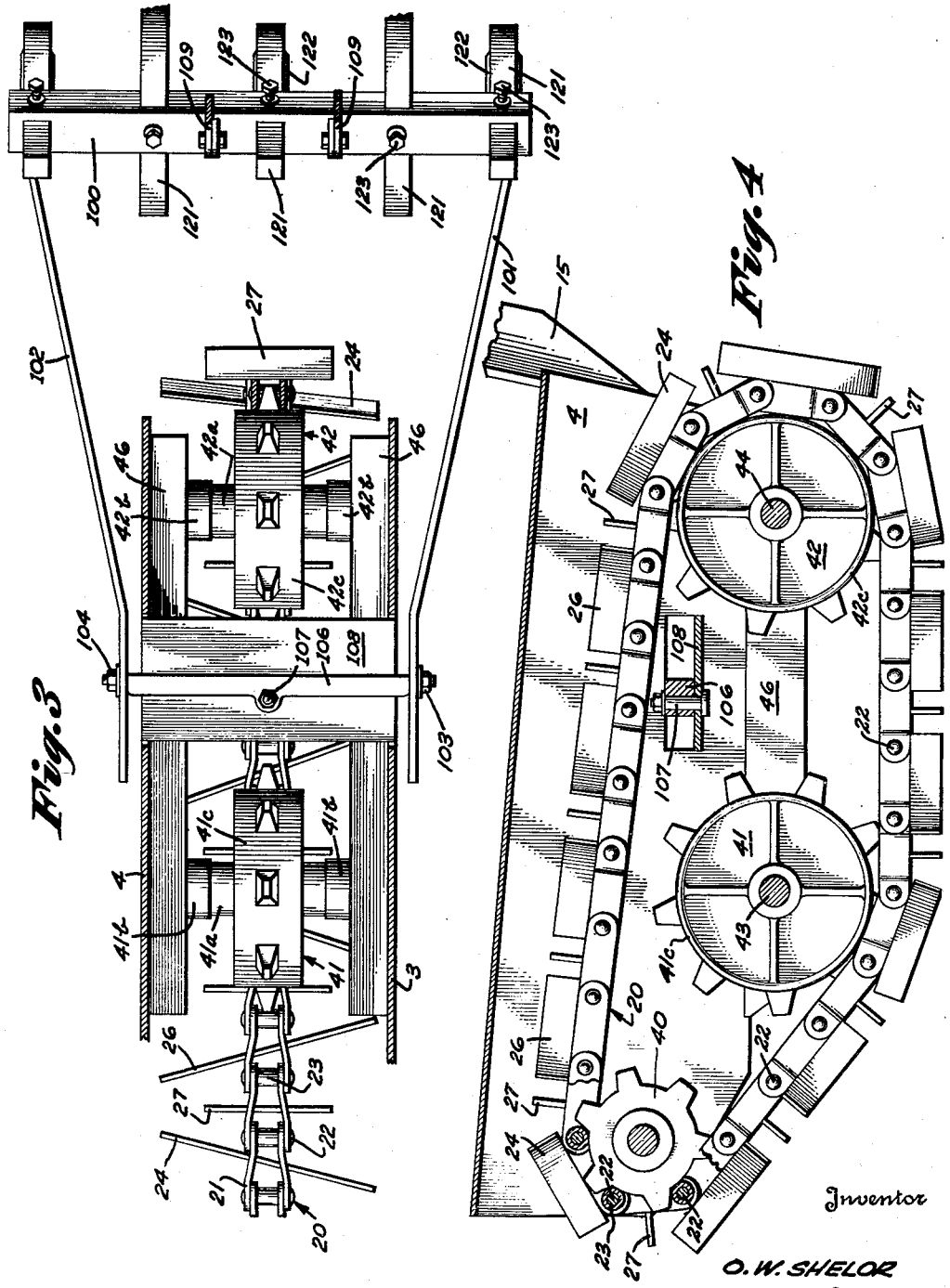

Patented Aug. 19, 1952

2,607,277

UNITED STATES PATENT OFFICE 2,607,277

GARDEN TRACTOR

Olie W. Shelor, Salem, Va., assignor of forty-nine per cent to Furman Whitescarver Application May 24, 1948, Serial No. 28,860

8 Claims. (Cl. 97—48)

This invention relates to a new and improved power cultivator or tractor particularly adapted for small farm or garden work and the principal object of the invention is to provide a lightweight, efficient, powered implement, which can be easily maneuvered by a walking attendant.

Garden tractors or power cultivators of the type which are steered by a walking attendant are very well known. These devices are used primarily for cultivating rows of growing plants, and careful and accurate steering is necessary since the plants must be avoided both by the tractor and by the ground working implements. Most of these tractors are provided with spaced traction wheels or traction devices, the power usually being applied either through dog-type clutches or through a differential to permit steering. The motor power being applied to the spaced traction wheels in this manner makes it somewhat difficult for the walking attendant to guide the tractor within close limits when cultivating between closely spaced rows of growing plants. As is well understood by those skilled in the art, when the power from the prime mover is divided through a differential to the spaced traction wheels, there is a tendency for the tractor to go on a straight course, assuming that there is no slipping of either of the wheels. Therefore, it takes considerable effort on the part of the walking attendant to cause the tractor to deviate from the straight course when the prime mover is under a hard pull. On the other hand, if one of the traction wheels should slip, even a very small amount with respect to the ground, the tractor immediately changes the direction of its travel and the walking attendant must exert considerable force upon the handle bars of the tractor to bring it back on to course. When the tractor is being used to cultivate growing crops where it is desired to maintain a definite distance between the shovels of the cultivator and the roots of the growing plants, strenuous effort is required on the part of the operator. Also, under such circumstances it is highly important that the cultivator immediately change its direction of travel with the tractor so that the steering of the tractor does not have a tendency to throw the cultivator shovels closer to the row of growing plants. With these two-wheeled tractors it has been the recent practice to provide a separate guide handle bar to control and guide the implement.

In order to avoid the disadvantages of the spaced traction wheels, single-wheel tractors have been developed. One of the big disadvantages of the single-wheel walking attendant type tractor is that they are difficult to maneuver on sloping ground or hillsides because any appreciable slippage of the traction wheel immediately permits the tractor to skid side-wise so that the tractor changes direction of travel. In view of the very nature of the single-wheel type tractor, the tool bar and tools are usualy rigidly secured to the tractor frame so that when the attendant attempts to correct the direction of travel of the tractor by leaning it to one side or the other the cultivator shovels on one side must penetrate the ground to a greater depth than those on the opposite side. If the operator attempts to correct the direction of travel of the tractor by turning the plane of the traction wheel about a vertical axis the implement will be steered in the opposite direction so that, if the cultivator is being used between two rows of growing plants, the cultivator shovels will of necessity come closer to one of the rows than the other with the result that the roots thereof may be severely damaged or the plants may actually be uprooted. If it is necessary to correct the direction of travel of the single-wheel type tractor to a large degree, it is necessary to shut off the power and reverse the tractor and set it on its corrected course. This requires considerable effort on the part of the operator and consequently such tractors can only be handled by persons of great physical stamina and weight.

The present invention overcomes the disadvantages of both of the prior types of tractors mentioned above by providing a tractor utilizing a single endless belt traction device in which the draw bar for the ground-engaging implements is so arranged as to permit the guiding of the tractor by merely leaning it from side to side. In view of the fact that the endless traction device runs over two sprockets arranged in tandem as distinguished from the laterally spaced traction wheels mentioned above, a hitch may be provided between the tractor and the implement so that the point of thrust is in the central plane of the traction device. Therefore, there is no tendency for the tractor to change its direction of travel merely as a result of slippage and consequently the walking attendant is not buffeted about by side to side movement of the guiding handle bar as a result of the power being applied to the traction device. In other words, the device even when pulling is in a state of substantial equilibrium so that the tractor can be tilted from side to side with a minimum of effort. On the other hand, when it is desired to make a short turn with the tractor, it is only necessary to rock the tractor on one of the tread sprockets in order to reduce the surface of the tread in engagement with the ground so that it may be easily turned much in the manner, in this respect, as a single-wheel tractor.

In accordance with the present invention, the hitch is so constructed that the point of thrust is in front of the rear sprocket and above the center of the latter, at a point approximately half way between the two tandem sprockets on which the weight of the tractor is carried and which are at the extremities of the portion of the traction device in engagement with the ground. Because of the curvature of the forward part of the reach of the endless traction device where it curves upwardly around the forward tandem sprocket, the tractor steers toward the direction in which the plane of the traction device is leaned. Accordingly, the point of thrust of the hitch being in front of and above the lower reach of the traction device, moves immediately in the direction that the tractor is leaned and steered so that the implement responds immediately to a slight leaning movement of the tractor. It will also be apparent that in a single tread tractor of the type described that means must be provided to maintain the tractor in an upright position when no attendant is operating the tractor. In the present invention the implement itself is relied upon for this function and accordingly appropriate means are provided between the frame of the tractor and the implement bar for adjusting the position of the implement with respect to the tractor for the purpose of controlling the depth of penetration of the implement and at the same time permitting such relative tilting movement about the longitudinal axis which will permit the steering action referred to above while at the same time serving as the means to prevent the tractor from falling over on its sides.

It will be readily apparent that, since in effect the walking attendant is substituted for the steering mechanism of other types of tractors and the attendant must provide the necessary forces for steering the tractor and maintaining it in an upright position, it is essential that a very convenient and efficient means be provided for controlling the application of power from the engine or prime mover to the traction device in order to prevent the tractor from overpowering the attendant in the event the ground engaging implements strike obstructions or in the event the stability of the tractor should be effected by the slope of the ground on which it is operating. In this connection the present invention provides a very simple clutch in the form of a V-belt which can be tightened by movement of the engine relative to the pulley journaled on the tractor frame. A special toggle-type control is arranged adjacent the steering handles for controlling the position of the motor and thus the operation of the V-belt clutch.

One of the primary objects of the present invention is the novel manner in which the draw bar is constituted and associated with the single endless chain type traction device whereby improved maneuverability and stability of the tractor is accomplished.

Another one of the major objects of the present invention is the provision of a tractor having a hitch which is so related to the tractor that the hitch is steered simultaneously in the same direction with the tractor.

Another object is to provide an improved novel garden tractor or power cultivator having a single endless chain type traction device in which the hitch between the tractor and the ground-engaging implements is so related that the hitch is steered simultaneously in the same direction with the tractor by merely tilting the plane of the traction device from one side to the other.

Another object is to provide an improved tractor which travels upon continuous rails constituted by the straight sides of the tread chain links, thereby preventing vibration or bumpiness in the forward movement of the tractor.

Another object is to provide an improved tractor having a single endless tread in which the tractor rests upon the tread by means of sprocket gears, the teeth of which do not roll upon the chain links but merely loosely project into the link openings to guide and hold the tread in place, the driving gear, the teeth of which, of course, roll upon the transverse elements of the links.

Another object is to provide a garden tractor or power implement of the type described in which the implement is coupled to the power device in the central medial longitudinal plane of the traction device at a point above and in front of the rearmost sprocket.

Another further object is to provide in a tractor of the type described, an improved toggle mechanism for engaging the clutch, said toggle mechanism being so arranged adjacent the handle of the tractor so that it can be quickly and efficiently manipulated by the operator without releasing his grip on the handle.

Another object is to provide an improvement in the power tractor or cultivator of the type described, in which the clutch comprises a V-belt, the tension of which is controlled by moving the power plant with respect to a pulley journaled on the frame, the power plant being biased in such direction as to loosen the belt to prevent driving connection and being pulled against the biasing means by a toggle mechanism arranged adjacent the handles of the tractor, whereby by a mere flip of a thumb or finger the drive between the power plant and the traction element may be interrupted.

Another object is to provide an improved means for controlling the depth of penetration of the implement and at the same time permitting limited relative leaning movement between the tractor and implement to permit the steering of the tractor while at the same time serving to limit the leaning of the tractor.

Other and further objects will become apparent from the following description when considered in connection with the accompanying drawings, illustrating an embodiment of the invention, and in which:

Figure 2 is a plan view of Figure 1;

Figure 3 is an enlarged partial plan section on line 3—3 of Figure 1 showing the position of the hitch;

Figure 4 is an enlarged partial sectional elevation showing the location of the hitch in the vertical plane;

Figure 5 is an enlarged partial detail section showing the manner in which the base of the power plant is mounted on the tractor frame; and Figure 6 is an enlarged elevational view of the toggle mechanism for controlling the tension on the V-belt drive.

Figure 1:
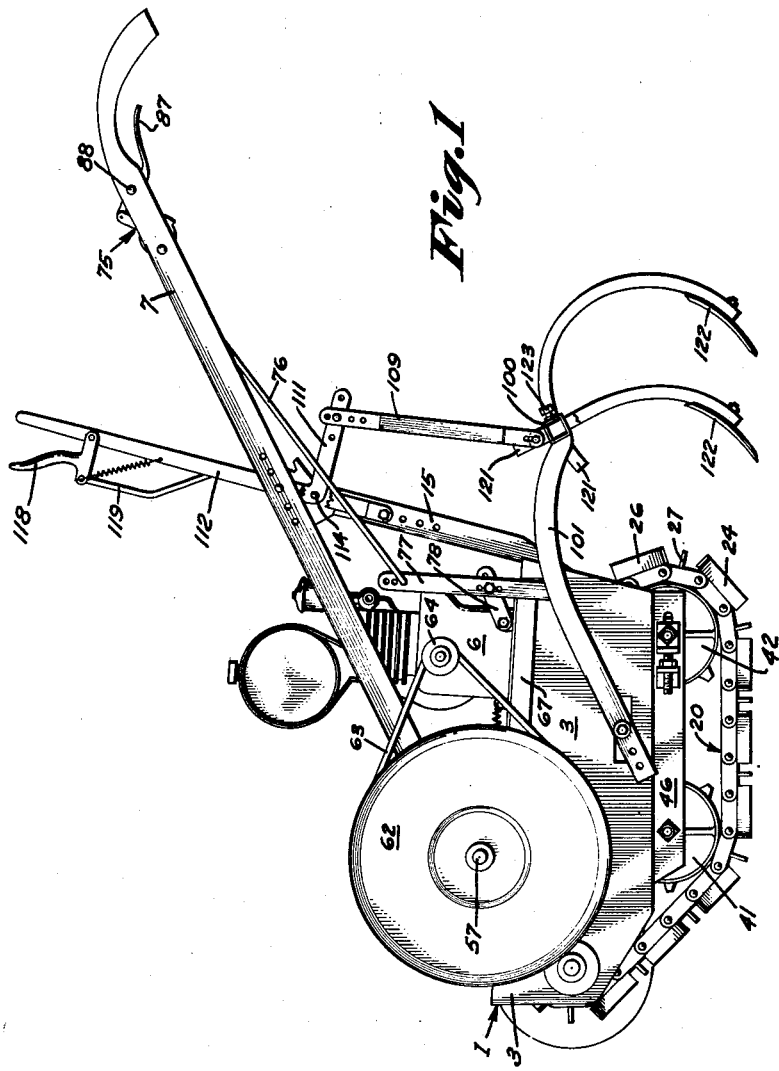
Figure 1 is a side elevation of a tractor embodying the principles of the present invention.

In the embodiment of the invention chosen for purposes of illustration, the numeral 1 represents in general the tractor frame which preferably comprises a sheet metal upper web 2 serving as a platform and lateral depending side plates 3 and 4. The flat web portion 2 constitutes a support for the prime mover or engine 6.

The tractor handle bars 7 and 8 are adjustably connected at their forward ends to suitable upright members 9 and 10, respectively, which are preferably in the form of short pieces of angle iron welded to the horizontal web portion 2 of the frame. The upright members 9 and 10 and the forward ends of the handle bars 7 and 8 are preferably provided with a series of holes which may be engaged respectively by bolts to adjust the forward ends of the handle bars longitudinally and vertically of the tractor frame. The positions of the rear ends of the handle bars are held in fixed adjustable positions through suitable struts 11 and 12 respectively. In this connection each of the handle bars has a series of holes which are engaged by suitable bolts which also engage a hole in the upper end of the respective struts. Each of the legs of the U-shaped bracket 15 is provided with a series of holes either of which may be engaged by a bolt which also extends through a hole in the lower end of the respective struts. It will be readily apparent that the struts cooperate with the adjustment at the forward end of the handle to raise and lower the latter.

The tractor is provided with a single endless chain type traction device 20 and comprises a chain having links, the side members 21 of which are straight in a vertical plane as will be seen in Figure 3. The side members are pivotally connected at their opposite ends by suitable pins 22, each of the pins having suitable rollers 23 in the conventional manner which are adapted to engage the sprocket wheels on which the traction device runs. Oppositely inclined traction cleats 24 and 26 are secured to the outer edges of the side members 21 of alternate links. These cleats may be welded to the links or the links and cleats may be cast into one piece. The oppositely inclined relation of the adjacent cleats 24 and 26 form alternate wide and narrow spaces between the cleats on each side of the tread. To prevent the weight of the tractor from causing the tread to sag in the span between the wider spaces, shorter cleats 27 uniform in height with the other cleats, are secured to the intermediate alternate links. These intermediate cleats 27 are arranged perpendicular to the central axis of the tread and in effect form the bisectors of the angles between the adjacent inclined cleats.

It is obvious that any tendency of the tread to slip laterally relative to the ground with which the cleats are engaged will cause a wedging action of the soil which will compact the soil and resist such tendency to slip. This keeps the tractor from sliding laterally while working on the side of a slope. It will be readily apparent that the inclination of the cleats will prevent the sliding in either direction.

It will be noted that the traction cleats are secured to the links of the chain in an edgewise position and that the cleats are very narrow so that they will easily penetrate the ground. It will also be apparent from the drawings, particularly Figures 1 and 4, that a certain amount of pulverizing and cultivating action will be produced merely by the traction device 20 itself. In certain conditions of soil the traction device can serve to break the crust on the upper surface. In other words, the tractor with its novel traction device could be run over the seed bed as a cultivating or pulverizing implement. This cultivating and pulverizing action is enhanced by the alternate inclination of the cleats. As it will be noted from Figures 1 and 4, as the traction device 20 passes around the idler sprockets 41 and 42, the relative spacing between the cleats 24, 26 and 27 changes, thereby tending to increase the pulverizing action. It will be readily apparent that by applying a load to the tractor the traction device 20 will slip a certain amount and that the pulverizing action of the traction device will thereby be increased. Accordingly, the combination as shown, including the tractor with the traction device 20 and the toothed implement, provide, in and of itself, an improved powered cultivator or implement because the traction device will tend to break up any large clods and the teeth of the implement will tend to further cultivate, pulverize and level the soil. Although, of course, in the arrangement shown, the width of the traction device is less than the implement shown, it will be readily understood that the overlapping of the previously worked ground by the sides of the implement would merely tend to produce a better job of cultivation or pulverization. Also, it will be readily apparent that if desired, instead of using the implement shown, any device in the form of a drag, harrow, or a subsoiler tooth could be used as a load for the tractor so as to cause the traction device 20 to slip a certain amount to get the desired pulverizing action on the ground.

The traction device 20 is adapted to engage and run over three sprockets 40, 41 and 42, the traction device being driven by the sprocket 40 and the weight of the tractor being carried by the sprockets 41 and 42. It will be apparent that the tractor is supported on the ground by the reach of the traction device between the sprockets 41 and 42. The sprockets 41 and 42 are journaled on suitable bolts 43 and 44, the outer ends of which engage angle iron reinforcing members 46, the latter being welded to the bottom edge of the side plates 3 and 4. The sprockets 41 and 42 have hubs 41a and 42a which are telescoped inside of cup-shaped caps 41b and 42b to serve as grease seals. One of the ends of each of the bolts 43 and 44 are provided with a suitable bore opening onto the bearing surface and in the outer end of which is secured a suitable high pressure grease fitting of the type which is well known in the prior art. The weight of the tractor is substantially balanced between the front and rear sprockets 41 and 42, respectively, so that the weight will be carried more or less uniformly by the reach of the thread between these two sprockets. This makes it comparatively easy to tilt the tractor either forward or backward about either the sprocket gears 41 or 42, respectively, as fulcrums, to facilitate turning the tractor on a very short radius.

As will be readily apparent from Figure 4, the arrangement of the teeth on the drive sprockets 40 are different from the arrangement of the teeth on sprockets 41 and 42. The teeth of the sprockets 41 and 42 are so shaped and spaced that they do not ride upon rollers 23 of the chain links but merely project freely through the openings in the links. The idler sprockets 41 and 42, respectively, are provided on the opposite sides of their teeth with circular peripheral flanges 41c and 42c which ride upon the side links 21 of the chain. Since the side members are of uniform depth, they form a continuous track upon which the peripheral flanges roll smoothly, thus avoiding vibration. It will be apparent to those skilled in the art that where the drive chain passes around the drive sprocket 40, adjacent links are angularly disposed so that a straight line joining the outer pivots of two adjacent links will be a chord of the pitch line of the sprocket and will be less than the sum of the lengths of the adjacent links, while where the chain travels in a straight flight, a straight line between the outer pivots of the adjacent links will be equal to the sum of the lengths of said links. Because the side members 21 of the links of the chain run on the flanges 41c and 42c of the respective idler sprockets 41, 42, the pivots between the links cannot operate on a fixed pitch circle on these sprockets; as the links pass around the sprockets 41 and 42, the pivots between the links must necessarily depart from the flanges when the chain follows the curvature of the flanges and the distance between the outer pivots of two adjacent links will not be a constant function of the pitch circle of the idler sprockets. Consequently, if the idler sprockets 41 and 42 which operate upon the straight reach of the chain, were identical with that of the drive sprocket 40, the teeth of the idler sprockets would not be synchronized with the openings in the links so that they would tend to ride up on the rollers 23 of the chain until the free turning rollers permit them to slip back into place, thus giving objectionable vibration and uneven riding. Therefore, the spacing between the centerlines of the teeth on the idler sprockets is different from that of the drive sprocket 40, and the spacing between the sides of the teeth are such that a very loose fit with the chain lengths is provided, thereby assuring that the teeth will not tend to ride the rollers, notwithstanding the variations in the angularity of adjacent straight flights. Therefore the idler sprockets function solely to guide and hold the tread in place on the sprockets.

By reason of the edgewise arrangement of the cleats on the links of the chain, an open track or traction device is provided and it will be apparent from the drawings that the teeth of the idler sprockets 41 and 42 will continuously force out any dirt or other foreign matter such as weeds, snow and the like. Accordingly, the present invention is capable of operating over ground under substantially any kind of conditions without the traction device becoming fouled.

The drive sprocket 40 which drives the traction device 20 is fixed to a cross shaft 51 which is journaled in suitable bearings 52 secured to the opposite side plates 2 and 3 at their forward ends. One end of the shaft 51 has fixed thereto chain sprocket 53 which is engaged by drive chain 54 which also engages a sprocket 56 on cross shaft 57. The shaft 57 is journaled in suitable anti-friction bearings 58 which are suitably secured to the web 2 of the tractor frame.

Power is applied to the drive sprocket 40 of the traction device by suitable engine or prime mover 6 by means of a large V-belt pulley 62 and a V-belt 63 which engages a smaller V-belt pulley 64 on the crank shaft of the engine 6. The engine 6 is slidably mounted on the web 2 of the frame in such a manner that the tension on the V-belt 63 can be regulated to serve as a friction clutch for controlling the transmission of power to the traction device 20. To this end, the engine 6 is provided with a suitable base plate 66 having angle iron members 67 welded to the opposite sides thereof. The angle iron members 67 are adapted to engage the upper corners of the tractor frame in nested relation so that the depending flanges of the members 67 serve as guide means for the base plate and engine. The base plate 66 and the horizontal flanges of the right angle members 67 (one of which is shown in Figure 5) are provided with longitudinal slots through which suitable bolts 68 extend. The bolts are not drawn down tight but are provided for the purpose of preventing the engine 6 from being displaced away from the top of the tractor frame while at the same time permitting longitudinal translatory movement of the engine 6. By moving the engine 6 toward the V-pulley 62 the belt 63 can be loosened so that the transmission of power from the engine to the traction device 20 is interrupted. By moving the engine in the opposite direction the belt can be tightened, thus serving as a power clutch. As will be seen in Figure 2, a suitable tension spring 71 is anchored between the web 2 of the frame and the engine so that the engine is normally biased to a position to loosen the V-belt 63.

The toggle mechanism 75 for controlling the position of the engine 6, is shown in Figure 6. The toggle is pivotally connected by means of a tension rod 76 to an upright lever 77, the lower end of which is pivotally connected to the left-hand side plate 3 of the frame. A suitable link 78 has one of its ends pivoted intermediately the end of the lever 77 and has its other end pivotally connected to an ear 79 carried by the base plate 66. As shown in Figure 1, the lever 77 as well as the link 78, is provided with a series of holes in order to vary the throw of the control mechanism as well as to change the relative position of the range of movement of the engine.

The toggle mechanism 75 comprises a disk member 81 which is pivotally mounted on a bolt 82 which engages the handle bar 7. The outer periphery of the disk 81 is provided with an arcuate notch 83, the respective opposite ends of which are adapted to engage a stop 84 also carried by the handle bar 7, at the extremities of the rotational movement of the disk. The tension rod 76 is pivotally connected to the disk 81 by means of a block 86. The block 86 is mounted for pivotal movement in the disk 81 and is provided with a hole through which the rod 76 extends, the outer end of the block being threadingly engaged by a cap screw adapted to frictionally engage the rod 76 in any desired adjusted position. It will be observed from Figure 6, that when one edge of the notch 83 of the disk engages the stop 84, the pivotal connection 86 will be moved slightly beyond dead center and it will be understood that in this position the control linkages would be so adjusted that the motor 6 would be in its rearmost position to tighten the belt 63 to provide a power drive between the engine and the traction device 20. It will also be apparent that when the disk 81 is rotated in a counterclockwise direction so that the rod 76 passes beyond dead center on the opposite side, the force of the spring 71 will pull the engine 6 forward, thus causing the disk 81 to rotate until the other edge of the recess 83 engages the underside of the stop 84. Suitable means are provided for easily and efficiently manipulating the disk 81 so that the tractor operator can quickly release or apply tension to the V-belt 63 by a mere flip of his thumb without having to release his grasp on the handle bar 7. To this end a hand lever 87 is pivotally connected to the handle bar 7 by means of a suitable bolt or rivet 88. As will be seen from Figure 1, the lever 87 is so shaped that it is placed in a position to be conveniently manipulated by a thumb or finger of the operator. A suitable link 89 is pivotally connected to the opposite end of the lever 87 and the pivotal connection 86. It will be readily seen that by moving the lever 87 away from the handle bar 7, the disk 81 will be moved in a clockwise direction, as viewed in Figure 6. By pushing down on the lever 87 the operator can cause the disk 81 to rotate until the pivotal connection 86 is slightly beyond dead center where its further movement will be arrested by the stop 84, as shown in Figure 6. In this position power will be transmitted from the engine to the traction device 20, by reason of the tightening of the belt 63. In the event it is necessary to quickly interrupt the transmission of power from the engine to the traction device 20, it is only necessary that the operator use his thumb or finger to apply a slight upward pressure on the lever 87 to move the pivotal connection 86 to the opposite side of dead center so that the spring 71 will move the engine forward and loosen the belt 63.

One of the salient features of the present invention is the novel manner in which the draw bar is associated with the single endless chain type traction device 20 whereby manipulation and stability of the tractor is accomplished and whereby a powered implement is provided in which the draw bar hitch is steered simultaneously and immediately in the same direction in which the tractor is steered. Because of the specific arrangement of the hitch, small changes in the direction of travel of the tractor for the purpose of accomplishing careful and accurate steering, may be accomplished merely by leaning the tractor from one side to the other. This overcomes one of the objections of some of the present commercial tractors which have recognized the difficulty in accurate steering and guiding of the implement and have provided a separate guide handle to control and guide the implement in addition to the two guide handle bars for the tractor.

In this connection an implement beam 100 is carried at the rear ends of curved arms 101 and 102 carried at the opposite sides of the tractor. These arms are pivotally connected as at 103 and 104, respectively, for pivotal movement about a horizontal axis to a draw bar evener 106. This latter draw bar evener is pivotally connected at 107 as by means of a bolt or pin to a transverse draw bar plate 108 which extends between and is secured to the opposite sides 3 and 4 of the tractor frame. Preferably this draw bar plate 108 is welded to the side of the frame and serves to increase the rigidity thereof. It will be readily apparent that because of the pivotal connection between the draw bar evener 106 and the draw bar plate 108, pivotal movement about a vertical axis is permitted between the tractor and the implement beam 100. It will also be noted that this pivotal connection is located between the idler sprockets 41 and 42 so that the longitudinal axis of the tractor frame can be pivoted with respect to the draw bar and its associated arms 101 and 102. In this way, in the event that it is desired to make a slight change in the direction of travel of the tractor, the implements will not be thrown to one side where they might damage one of a row of crops between which the implement might be operating.

One of the most significant features of this hitch is that its point of connection to the tractor frame is in the plane of the traction device 20. The two idler sprockets 41 and 42 on which the traction device 20 runs, can be considered as traction wheels in tandem as distinguished from traction devices which are spaced laterally with respect to each other, thus permitting the plane of the tractor to be leaned to one side or the other. Because of the curvature of the forward part of the reach of the endless traction device 20 where it curves upwardly around the forward tandem idler sprocket 41, the tractor steers toward the direction in which the plane of the traction device is leaned. Therefore, it will be readily apparent that in the event the frame of the tractor is leaned to one side the pivotal connection 107 will be moved in the same direction and because of the steering characteristics of the single traction device 20 the tractor will tend to steer in the direction in which it is leaned. This will cause the hitch and the implement to be steered simultaneously in the direction with the tractor, thus eliminating the need for a separate handle for guiding the implement.

In order to limit the amount of relative pivotal movement between the tractor and the implement about a longitudinal axis, means are provided in the form of struts 109 which have their lower ends pivotally connected to the implement beam 100 and have their upper ends pivotally connected to an arm 111 which is a part of a bell crank 112. This bell crank is pivoted at 114 to a bracket carried by the tractor frame. The bracket has fixed thereto a toothed sector 116 adapted to be engaged by a pawl 117 carried by the bell crank 112, the pawl being adapted to be actuated through the lever 118 and a connecting rod 119. It will be apparent that the position of the bell crank 112 and the arm 111 can be controlled by manipulation of the pawl 117 so that the bell crank lever 112 can be held in any desired position and thus the implement beam 100 may be placed in any desired adjusted position with respect to the tractor frame for the purpose of regulating the depth of penetration of the implement. The lower ends of the struts 109 are provided with slots which are engaged by bolts which also engage holes in ears on the implement beam 100 to provide a lost motion connection with the implement beam, thus permitting the relative longitudinal pivotal movement mentioned above. This relative pivotal movement permits the minor steering action while at the same time preventing the tractor from falling on its side. It will also be understood that for making short turns with the tractor the implement may be raised so that the tractor can be tilted or rocked on the rear tandem sprocket 42.

The implement beam 100 is preferably a hollow rectangular tube having suitable openings therein at spaced intervals to receive the shanks 121 of cultivating implements such as hoes or shovels 122. The openings are preferably polygonal in shape to prevent rotation of the shanks, the latter being secured by set screws 123 in the usual manner. The shanks 121 are curved so that if it is desired to change the relative depth of the shovels the curvature of the shaft also provides the correct angle at which the shovel penetrates the ground.

From the foregoing description it will be readily apparent that the present invention provides a novel and improved powered cultivator or tractor which can be manipulated by an operator walking behind the tractor and which tractor is highly maneuverable and its stability and steering is unaffected by the power applied to the traction device. Also, it will be understood on the other hand that because of the arrangement of the hitch between the tractor and the working implements the unit can be steered very easily by merely leaning the tractor from one side to the other. It will also be clear that the weight is so distributed on the tractor that for making short turns the tractor may be tilted so that the weight is carried on either of the spaced idler sprockets so that the tractor can be turned substantially on one wheel. The arrangement is such that the depth of the implements can also be readily adjusted and the leaning of the tractor does not affect the depth at which the implements on the opposite sides of the implement beam engage the ground.

Although the invention has been described in considerable detail, it will be apparent to those skilled in the art that many variations are possible without departing from the inventive concept. It is therefore desired that the invention not be limited except insofar as is made necessary by the prior art and by the appended claims.

I claim:

1. A tractor comprising a combination frame and housing, including a transverse web platform and side plates depending therefrom, front and rear wheels in aligned tandem relation mounted between said side plates for supporting said frame, an endless chain type traction device passing over said wheels, power means for driving said traction device, and an implement beam connected to said frame for relative pivotal movement about a vertical axis within said endless traction device.

2. A tractor comprising a frame including a transverse web platform and side plates depending therefrom, spaced wheels in aligned tandem relation mounted between said side plates for supporting said frame, an endless chain type traction device passing over said wheels, means for driving said traction device, an implement beam and means for connecting said beam to said frame for pivotal movement about a vertical axis passing through said endless traction device.

3. A tractor as claimed in claim 2 in which the connection between said implement beam and said tractor frame is at a point above the axes of said wheels.

4. A tractor comprising a frame including a transverse web platform and side plates depending therefrom, front and rear wheels in aligned tandem relation mounted between said side plates for supporting said frame, an endless chain type traction device passing over said wheels, power means for driving said traction device, a transverse draw bar plate connected between said side plates, a draw bar evener pivoted to said draw bar plate intermediate said side plates, an implement beam connected to said evener.

5. A tractor as claimed in claim 4 in which said implement beam is pivotally connected to said draw bar evener for pivotal movement about the horizontal axis of said evener.

6. A tractor as claimed in claim 5 having means carried by said frame for raising and lowering said implement beam.

7. A tractor as claimed in claim 6 in which the means for raising and lowering said implement beam comprises a plurality of struts extending from the central plane of said tractor which have lost motion connections with said implement beam at points spaced equally distant from the center of said beam to permit limited relative vertical movement.

8. Tractor comprising a frame including a transverse web platform and side plates depending therefrom, longitudinally spaced idler gears in aligned tandem relation journaled between said side plates and projecting below said side plates for supporting said frame, a traction drive gear journaled on said frame above the level of said idler gears, an endless belt traction device comprising a chain with traction cleats passing about said idler gears and said drive gear, said chain having straight sided links, said idler gears having teeth spaced to match the openings in the links in the straight flights of chain which they engage, and which project loosely into said openings and having circular flanges on opposite sides of said teeth that ride upon the sides of said links, the spacing of the teeth of said driving gear being such the links are engaged between said teeth at the pitch line thereof, a prime mover mounted on said platform, driving connections between said prime mover and said drive sprocket including a V-belt, said prime mover being mounted on said platform for longitudinal movement to vary the tension on said belt to control the transmission of power to said drive sprocket, handle bars extended rearwardly from said frame for guiding said tractor, an implement bar pivotally connected to said frame for relative pivotal movement about a vertical axis within said endless traction device and a handle bar extending rearwardly from said frame for guiding said tractor.

OLIE W. SHELOR.

REFERENCES CITED

The following references are of record in the file of this patent:

UNITED STATES PATENTS

| Number | Name | Date |
|---|---|---|
| 1,302,317 | Cowan | Apr. 29, 1919 |
| 1,335,052 | Gordon | Mar. 30, 1920 |
| 1,399,021 | McCarthy | Dec. 6, 1921 |
| 1,497,695 | Nobbs | June 17, 1924 |
| 1,833,030 | Peters | Nov. 24, 1931 |
| 2,410,543 | Kester | Nov. 5, 1946 |
| 2,425,698 | Kuchar | Aug. 12, 1947 |
| 2,433,709 | Rogers | Dec. 30, 1947 |
| 2,458,079 | Johnson et al. | Jan. 4, 1949 |